US005317126A

United States Patent [19]

Couch, Jr. et al.

[11] Patent Number: 5,317,126

[45] Date of Patent: May 31, 1994

[54] NOZZLE AND METHOD OF OPERATION FOR A PLASMA ARC TORCH

[75] Inventors: Richard W. Couch, Jr., Hanover; Nicholas A. Sanders, Norwich; Lifeng Luo, Lebanon; John Sobr, Enfield; Patrik Bäckander, Lebanon, all of N.H.

[73] Assignee: Hypertherm, Inc., Hanover, N.H.

[21] Appl. No.: 820,278

[22] Filed: Jan. 14, 1992

[51] Int. Cl.⁵ .................. B23K 9/00

[52] U.S. Cl. .................. 219/121.51; 219/121.5; 219/121.48; 219/121.59

[58] Field of Search .................. 219/121.51, 121.49, 219/121.52, 121.5, 74, 75, 121.39, 121.55

[56] References Cited

U.S. PATENT DOCUMENTS 3,641,308 2/1972 Couch, Jr. et al. .
3,770,935 11/1973 Tateno et al. .................. 219/121.5
4,163,891 8/1979 Komatsu et al. .................. 219/121.51
4,361,748 11/1982 Couch, Jr. .
4,382,170 5/1983 Klingel .
4,521,666 6/1985 Severance, Jr. et al. .
4,558,201 12/1985 Hatch .................. 219/121.520
4,625,094 11/1986 Mashic et al. .................. 219/121.51
4,743,734 5/1988 Garlanov et al. .
4,777,343 10/1988 Goodwin .................. 219/121.5
4,861,962 8/1989 Sanders et al. .
4,902,871 2/1990 Sanders et al. .................. 219/121.4
5,017,752 5/1991 Severance Jr. et al. .

FOREIGN PATENT DOCUMENTS 0030180 2/1988 Japan .................. 219/121.51
WO8801126 6/1988 PCT Int'l Appl. .
1234104 5/1986 U.S.S.R. .

*Primary Examiner*—Mark H. Paschall
*Attorney, Agent, or Firm*—Dike, Bronstein, Roberts & Cushman

[57] ABSTRACT

In a plasma arc cutting torch a flow of plasma gas is bypassed out of a plasma chamber, preferably at an annular gap between a pre-orifice in an inner nozzle piece and an exit nozzle orifice in an outer nozzle piece. A bypass channel formed between the inner and outer nozzle pieces directs the bypass flow to atmosphere. A metering valve or restricting orifice remote from the gap controls the amount of the bypass flow and delays the response of changes in the flow parameters in the plasma chamber to changes in the bypass flow. The pre-orifice and nozzle orifice are positioned and dimensioned to optimize the mass flow velocity and the strength of a vortex-type flow at the pre-orifice, thereby creating a virtual nozzle immediately below the electrode. The gas flow in the plasma chamber is highly uniform and very steady.

26 Claims, 5 Drawing Sheets

NOZZLE AND METHOD OF OPERATION FOR A PLASMA ARC TORCH

BACKGROUND OF THE INVENTION

This invention relates in general to plasma arc cutting torches and their method of operation. More specifically, it relates to an improved nozzle and related method of operation particularly useful in high definition torches.

Conventional plasma arc cutting torches produce a transferred plasma jet with current density that is typically in the range of 20,000 to 40,000 amperes/in$^2$. High definition torches are characterized by narrower jets with much higher current densities, typically about 60,000 amperes in$^2$. High definition torches are desirable since they produce a narrow cut kerf and a square cut angle. They also have a thinner heat affected zone and are more effective in producing a dross free cut and blowing away molten metal.

One problem with high definition torches is the need to cool the nozzle very efficiently. A cold nozzle wall at the nozzle exit orifice produces a thin boundary layer of cooled gas. This protects the nozzle and pinches the arc, that is, causes the arc to contract by this energy drain from its boundary. In order for the plasma arc to maintain enough charge carriers (ionization) to continue to conduct electrical current, the plasma arc will react to the constricting by increasing its centerline temperature and thus its ionization rate. This cooling is also important to control double arcing and gouging of the nozzle orifice, which occurs when the arc contacts the wall. Water cooling has proven effective in achieving the necessary degree of cooling.

Another problem is that even though the gas pressure and density in the plasma chamber are more than twice the values of these parameters in conventional torches, the mass flow rate is still lower than that in conventional torches. This is caused by the necessarily small diameter nozzle orifice of a high definition nozzle, which quickly chokes the plasma gas, yeilding a very low mass flow rate. These conditions choke the flow of plasma gas out of the torch. The low mass flow rate of the choked flow produces at least three other problems.

First, the low mass flow rate destabilizes the point of attachment of the arc on the electrode, or more precisely, on the hafnium or zirconium insert at the lower end of the electrode. As a result, the insert exhibits a severe random pitting rather than an even, parabolic wear pattern. The life of the electrode is therefore reduced. Also, as the point of attachment shifts over the insert, the entire arc column destabilizes. Destabilization from any source greatly reduces cut quality; the cut angle is worse and dross builds up under the workpiece. Second, the low mass flow rate means that there is a weak cold flow around the arc as it interacts with the nozzle. With a thin cold wall, the shape of the arc is very sensitive to the shape (condition) of the nozzle. As a result, cut quality becomes very sensitive to the condition of the nozzle. A slight nick in the edge of the nozzle can significantly alter the cut angle and produce dross. Third, the time required to eject a pilot arc out of the nozzle, as required for arc transfer, is greatly increased by a low flow rate associated with high definition torches. Copper oxide has a tendency to build up on the inner surface of the nozzle during the pilot arc state. The nozzle surface becomes very rough after several hundred starts. The nozzle life is thus reduced.

In the past, various types of plasma gas flows have been used to stabilize the arc. One technique, discussed briefly above, is cold wall stabilization. The wall of the nozzle adjacent the plasma jet is cooled. This creates a boundary layer of cooled plasma gas that contracts the arc and holds it spaced from the nozzle. Another technique is vortex flow stabilization. Plasma gas is injected into the plasma chamber tangentially to impart a swirling movement to the gas as it flows axially through the plasma chamber toward the nozzle exit orifice. As the gas rotates in the chamber, hotter, lighter gases remain near the center, while cooler, heavier gases are driven by centrifugal force toward the outer walls of the chamber. This produces a cool gas boundary layer that stabilizes the arc. Finally, sheath stabilization has also been used. A large axial flow of comparatively cold gas surrounds the arc. Heat from the arc dissipates to this cold sheath, causing the arc to constrict, the "thermal pinch" effect, thereby stabilizing the arc.

Combinations of these techniques are also used. For example, in known high definition torches the plasma flow is typically swirled and the nozzle is water cooled. However, the mass flow rates in high definition torches are so low that the level of stabilization provided by vortex flow or cold wall stabilization are not sufficient to overcome the arc stability problems noted above. Nor do any of these prior art techniques solve the other low mass flow rate problems of high definition torches such as the accumulation of "black" (copper oxide) on the nozzle. Moreover, the straight forward expedient of increasing the gas flow to the torch does not work because of the severe choking effect of the heated gas in the plasma chamber.

It is therefore a principal object of the present invention to provide an improved nozzle and method of operation for a plasma arc cutting torch that greatly enhances arc stability, cut quality and the useful life of both the electrode and the nozzle.

Another principal object of this invention is to provide a high level of cut quality throughout the useful life of the electrode and the nozzle.

A further object is to facilitate initiation of a pilot arc using high voltage, high frequency starting.

Another object is to promote even wear on the electrode and greatly reduce the accumulation of copper oxide on the nozzle.

Still another object is to produce cuts characterized by square cut angle and substantially no dross.

Yet another object is to provide an improved nozzle and method of operation that are compatible with a method of operation requiring a complete and reliable cessation of plasma gas flow on cut off of the arc current.

A further object is to provide the benefits of a high mass flow rate of plasma gas through the plasma chamber with a strong vortex action despite flow choking at the nozzle orifice.

A yet further object is to provide all of the foregoing advantages utilizing known materials and manufacturing techniques and a favorable cost of manufacture.

SUMMARY OF THE INVENTION

A plasma arc torch, particularly a high definition torch for piercing and cutting metallic plates, has a second outlet for a plasma gas flowing through a plasma chamber between an electrode and a surrounding nozzle. The electrode typically has a hafnium insert at its lower end opposite a main exit orifice of the nozzle, the first gas outlet. The second gas outlet can be formed as a set of circumferentially spaced ports in a swirl ring. Preferably, however, the second outlet is formed in the nozzle itself at a point downstream of the tangential inlet ports of the swirl ring. In a preferred embodiment the nozzle is a two piece nozzle with an inner nozzle and a surrounding outer nozzle. The second outlet is then an annular gap between a pre orifice formed in the inner nozzle and the nozzle orifice formed in the outer nozzle. They are aligned and axially spaced. The inner and outer nozzles are mutually spaced, at least over their lower portions adjacent the pre orifice and nozzle orifice, to define a bypass channel that directs a portion of the plasma gas diverted through the second outlet from the plasma chamber to atmosphere via a vent path.

The vent path preferably includes a set of vent holes formed in the nozzle and in fluid communication between the bypass channel and a gas outlet passage. The vent holes resist the flow, but do not substantially impede it. A needle valve or the like mounted in the outlet passage controls the venting. It is remote from the second gas outlet to buffer flow transients at the nozzle using the volume of gas in the channel, the vents, and the volume of gas in the outlet passage upstream of the valve. Another needle valve upstream of the plasma gas inlet of the torch controls the total gas flow to the torch. For a given nozzle, these valves adjustably set i) the ratio of flow through the main and secondary gas outlets and ii) the gas pressure in the nozzle.

This nozzle construction creates a virtual orifice at the pre-orifice. The gas flow rate and vortex strength are increased greatly at the pre-orifice. This condition is important to stabilizing the arc on the electrode insert. The invention causes a high mass flow rate of the plasma gas to sweep over the entire electrode, including its lower end face. It also produces a high mass flow rate that extends at least in its preferred form, along entire plasma chamber to a point very near the nozzle exit orifice. It is also important that the flow is highly steady and uniform so that there is little or no disturbance in the boundary layer.

These and other features and advantages of the present invention will be more fully understood from the following detailed description which should be read in light of the accompanying drawings.

DETAILED DESCRIPTION OF THE PREFERRED EMBODIMENT

Figure 1:
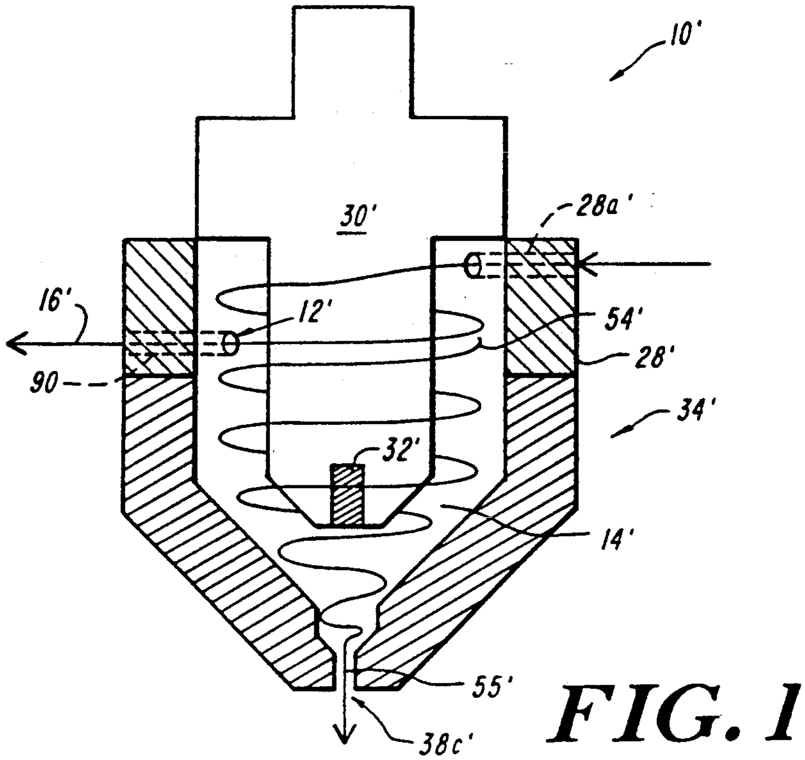
FIG. 1 is a highly simplified view in vertical section of a plasma chamber of a plasma arc torch with a second set of gas outlet ports in a swirl ring.

FIGS. 3–6 show a plasma arc cutting torch 10 utilizing a second gas outlet 12 from a plasma chamber 14 to create a bypass flow 16 of plasma gas. The flow 16 vents to atmosphere via a bypass channel 18 and a vent path 20 that includes vent holes **20*a*, a gas outlet passage 20*b*, and a needle valve 22. The torch 10 has a body 24, a plasma gas inlet passage 26, a swirl ring 28, and an electrode 30 with a hafnium insert 32 press fit in its lower end face 30*c***.

A principal feature of the present invention is a two piece nozzle 34 having an inner nozzle piece 36 and an outer nozzle piece 38 that are mutually spaced to define the bypass channel 18. The nozzle pieces have upper portions **36*a*, 38*a* that are generally tubular, and lower portions 36*b*, 38*b* that converge to a pre orifice 36*c* and a nozzle exit orifice 38*c*, respectively. As shown, these lower portions 36*b*, 38*b* are generally conical, but they can assume a variety of cup like shapes where the flow path has a diameter that narrows as the gas flows through it. The inner nozzle 36 is capped by a mounting flange 36*d* with a step recess 36*e* that seats the swirl ring 28. An O-ring 40 seals the interface of the nozzle flange 36*d* and the swirl ring 28. An O-ring 42 seals the outer surface of the flange 36*d* to the torch body 24. The vent holes 20*a* are formed in the upper end of the outer nozzle upper portion 38*a*. A recess 38*d*, in cooperation with the facing portion of the torch body sealed by the O-ring 42 and another O-ring 44, forms an outlet gas chamber 46 that encircled the outer nozzle. The vent holes 20*a* are equiangularly spaced. Their dimensions and number provide some resistance to the gas flow 16, but they do not offer substantial resistance. The resistance smoothes the flow 16** at the nozzle, isolating it somewhat from downstream flow variations.

A plasma gas flow 48 is fed via the gas inlet passage 26 through the torch body to a gas inlet chamber 52 at the outer side surface of the swirl ring 28. The inlet chamber acts as a small plenum to distribute a uniform flow of plasma gas to all of the canted holes **28*a* in the swirl ring. The gas exiting the canted holes is tangentially directed to produce a swirling vortex flow 54 (FIG. 4) that spirals down the plasma chamber between the electrode and the inner surface of the inner nozzle piece 36. The flow has a substantially constant cross-sectional flow area over the region defined by the upper nozzle portion 36*a* and the opposite cylindrical portion of the electrode. The flow path then narrows and converges along the path portion defied by the lower nozzle portion 36*b* and the chamfered electrode end surface 30*b* at the lower end 30*a*** of the electrode. As discussed above, the swirling flow, combined with the decreasing diameter of the flow area, produces strong, high velocity vortex flow control over the arc.

The main thrust of the present invention is that the second gas outlet 12 diverts, or bypasses, a significant portion of the gas flow 48, 54 so that the mass flow rate of the flow 54 in the plasma chamber is high (a typical value being 50 scfh), while the main outlet has flow 55 through the nozzle orifice 38c is much smaller (a typical value being 10 scfh). The difference between the main plasma outlet flow 55 and the inlet flow 48 is the bypass flow 16. Also, the high flow rate of the vortex flow 54 is maintained all along the electrode, including its end surfaces 30b, 30c. It is also important that the second outlet 12, preferably an annular gap between the pre-orifice 36c and the nozzle orifice 38c, is located immediately before the nozzle orifice. This condition provides good control over the arc and stabilizes the arc by maintaining a strong vortex flow, especially from the insert 32 to the nozzle orifice 38c.

It is also significant that the nozzle construction produces a highly laminar and uniform flow since disturbances in the flow can destabilize the arc. In particular, the inner surfaces of the nozzle portions 36b, 38b slope smoothly and uniformly toward the pre orifice and the nozzle orifice. The transitions from these inner surfaces to the cylindrical side walls of the pre orifice and orifice are also smooth and uniform. The diameter of the pre-orifice is larger than that of the orifice to accommodate the differences in flow rates through each orifice without creating turbulence. The axial spacing of the pre orifice to the nozzle orifice is selected to allow a splitting of the gas flows while also maintaining a good control over the arc.

The angle A of the generally conical bypass channel 18 with respect to the centerline 56 of the torch (measured from the centerline in the direction of the gas flow through the torch, from top to bottom, as shown) is also important to the proper functioning of the bypass channel. If the angle is too severe, e.g., less than about 45°, there is a dimunition of the ability of the channel 18 to draw off the gas flow 16 at the required mass flow rate. An angle of about 45° is preferred, Larger angles are possible, but as the angle approaches 90° there is a broadening of the geometry of the lower end of the torch which complicates gas flow interaction with the workpiece, interferes with the dissipation of heat from the front end of the torch, and decreases the ability to observe the action of the plasma jet 57 on a workpiece 58. (As used herein, "upper" and "lower" are not meant in a limiting sense. In use, the "upper" end of a torch or a nozzle piece may actually be horizontal with, or below, a "lower" end.)

Turning briefly to features of the torch 10 not directly involved in the present invention, the electrode 16 is hollow to allow water cooling via a tube 60. The cooling water circulates through the torch via internal passages to a water cooling chamber 62 where the water flows over the lower portion 38b of the nozzle to cool the nozzle, particularly the walls of the nozzle orifice 38c. The tip 38e of the nozzle is thickened and formed of a material with good thermal conductivity, typically copper to provide mechanical strength and a heat sink. An O-ring 64 isolates the gas inlet chamber 52 from the water flow path. A water cap 66 threads into the lower end of the body at 66a to define, in part, the water chamber 62 and a flow path 67a for a secondary gas flow 67 (as opposed to the plasma gas flow 48, 54, 55).

The flow 67 produces a gas shield that helps to protect the nozzle against upwardly splattered molten metal during piercing. During cutting, the secondary gas flow rate is reduced so as not to destabilize the arc. It remains at a level sufficient to assist the cut and cool a nozzle shield 68 when the arc is translated over the workpiece for cutting. The nozzle shield 68 includes a replaceable insert 68a. The insert includes bleed ports 68b angled away from the arc. A set of flow restricting ports 69 limits the amount of secondary gas that can rush out of the torch when the arc is cut off. A plenum 72 in the secondary gas flow path downstream of the ports 69 and upstream of a swirl ring 70 provides a small local supply of secondary gas that is sufficient to stabilize the arc as it is cut off. The nozzle shield 68 is conductive, but mounted to an insulating outer portion 24a of the torch body 24 to be electrically floating and thereby resist double arcing. The nozzle shield operates in accordance with the disclosure of U.S. Pat. Nos. 4,861,962, which disclosure is incorporated herein by reference.

It will be understood that the torch 10 also includes an electrical circuit that connects the negative side of a D.C. power supply to a cathode body 24b threaded to the electrode 30. The positive side is connected to the nozzle 34 through the water cap 66 and other conductive members mounted in the torch body to form a pilot arc circuit. When the arc transfers, the circuit is completed through the workpiece 58 as indicated by the plus sign in FIG. 5. It will also be understood that in addition to the fluid passages and seals shown and described, the torch body 24 has other passages, ports, and seals (not shown) to conduct the gas and liquid flows mentioned above through the torch. They do not form part of the present invention.

Figure 5:
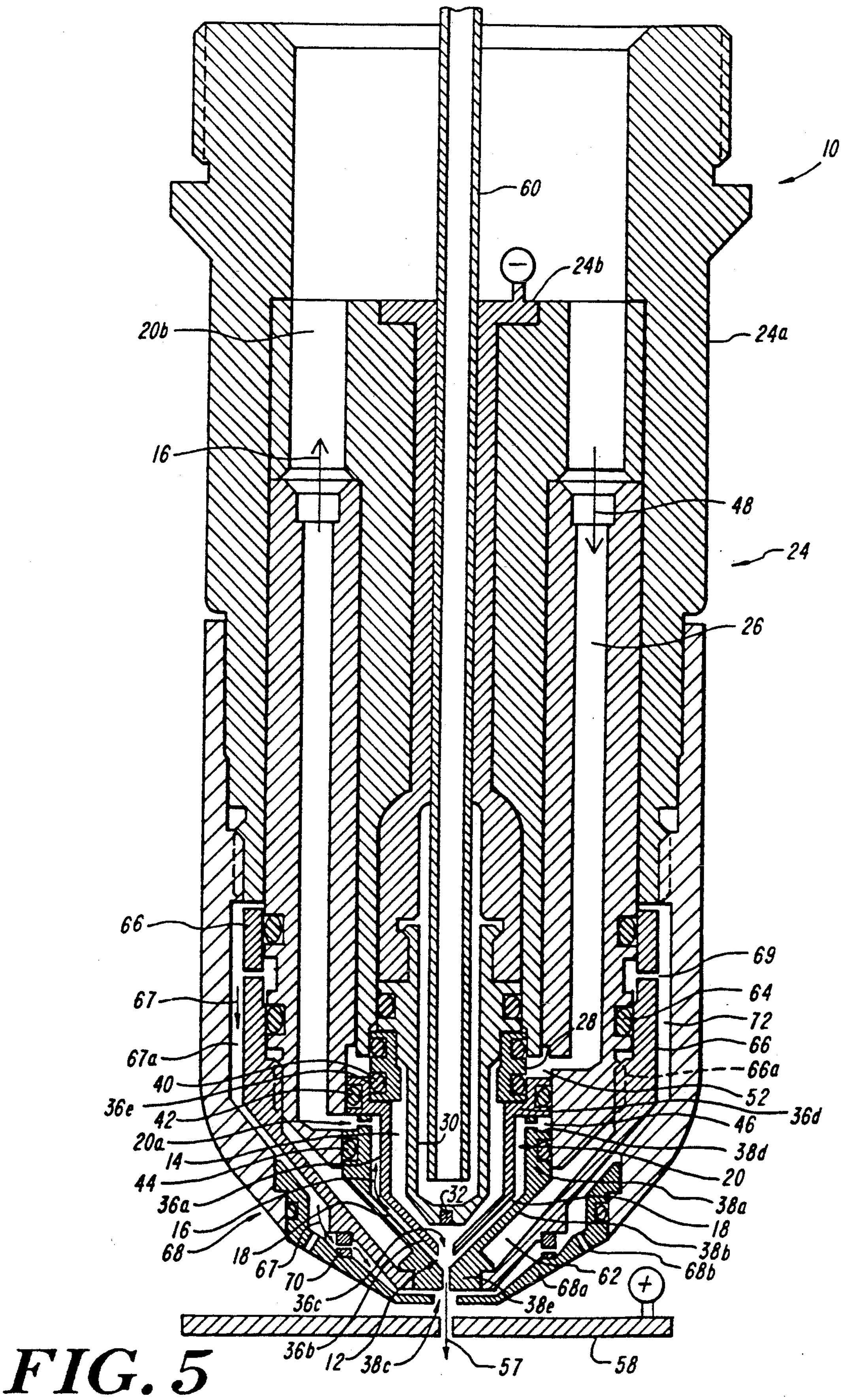
FIG. 5 is a detailed view in vertical section of a high definition plasma arc cutting torch according to the present invention utilizing the preferred nozzle construction shown in FIG. 4.
Figure 6:
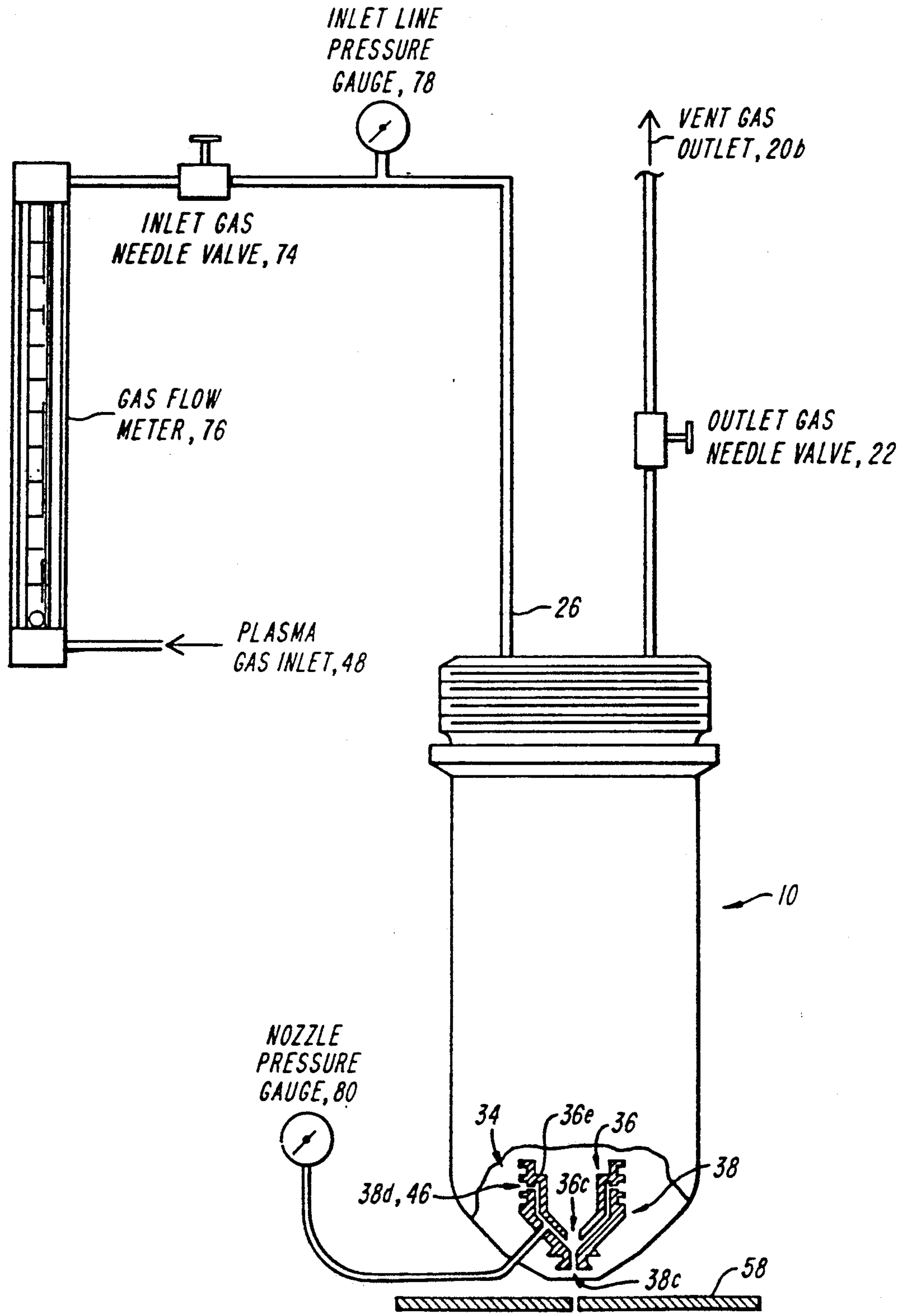
FIG. 6 is a simplified view in side elevation with portions broken away and portions in vertical section of a gas flow control system for use in conjunction with the torch shown in FIG. 5.
Figure 7:
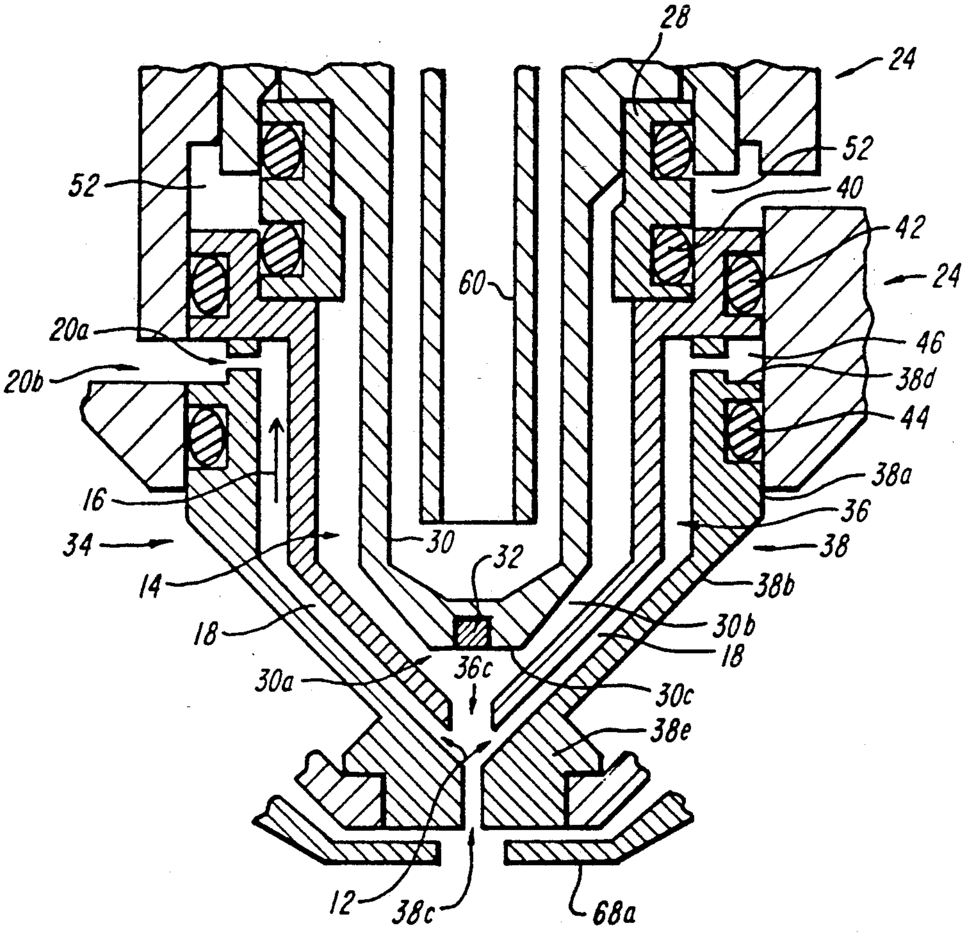
FIG. 7 is an enlarged view in vertical section of the components.

FIGS. 5 and 6 show the gas flow controls for setting the total gas flow to the torch, as well as the rates of the bypass flow 16 and plasma flow 55. The location of the vent needle valve 22 is also significant in delaying changes in the gas flow in the plasma chamber in response to changes in the vent path 20 in a ramp down process where the plasma gas flow is ramped down in coordination with a cut off of the arc current. The needle valve 22 is the choke point in the vent path 20. If it is located close to the second gas outlet 12, when the gas flow 48, 54 and arc current are ramped down and cut off in accordance with the disclosure of U.S. Pat. No. 5,070,227, the arc has a tendency to blow out prematurely. Moving the choke point away from the nozzle, as shown, has been found to avoid this problem. It is believed that the volume of gas in the channel 18 and passage 20b acts in a manner analogous to an electrical capacitor to buffer the choking action of the needle valve from the gas flow in the nozzle.

An inlet needle valve 74 sets the plasma gas flow rate to the torch 10. A flow meter 76 and pressure gauge 78 monitor the flow 48. For experimental purposes, a second pressure gauge 80 connects to and measures the gas pressure at the nozzle.

The desired nozzle orifice size is determined by the total current rating and the current density. For a given orifice, the plasma gas flow is a function of the gas pressure in the plasma chamber. This pressure, in turn, is a function of, and controlled by, 1) the setting of the inlet needle valve 74, 2) the amount of choke set by the needle valve 22, and to a lesser degree, 3) the flow resistance of the vent holes 20a. However, the number and dimensions of the vent holes are fixed for a given nozzle. Therefore, the needle valve settings are two independent variables that vary two dependent variables, the nozzle pressure and the ratio of nozzle orifice flow 55 to the bypass flow 16.

These variables are set experimentally as follows. The vent needle valve is closed with an arc on. The inlet needle valve 74 is then varied until the desired nozzle pressure is established. The flow rate is measured which is the plasma flow 55 only. The total desired flow rate can then be calculated from the desired flow ratio. Finally, the vent needle valve 22 is opened and the settings for both valves are varied until the calculated total flow rate is indicated by the flow meter 76 and the gauge 80 reflects the desired nozzle pressure.

In commercial use, the total flow rate for the torch is known. Also, the inlet line pressure measured at gauge 78 at cold flow is related to a known manner to the nozzle pressure when the arc is on. Therefore the needle valves 22 and 74 can be set according to the total flow ratio over the inlet line pressure without the arc on. The gauge 80 is therefore not required for normal commercial use.

By way of illustration, but not of limitation, for a torch 10 having a current rating of 15 amperes and a current density of 60,000 amp/in$^2$, the pre-orifice has a diameter of 0.047 inch, the nozzle orifice has a diameter of 0.018 inch and a length of 0.040 inch. The orifices are spaced axially by 0.015 inch. The vent holes 20*a* are three in number and each have a diameter of 0.025 inch. The ratio of flow 16 to 55 is approximately 5:1. The flow rate of the gas flow 54 in the plasma chamber is the same as the total flow rate, but the velocity is greater since the cross sectional flow area is at a minimum as the flow enters the pre orifice.

Figure 2:
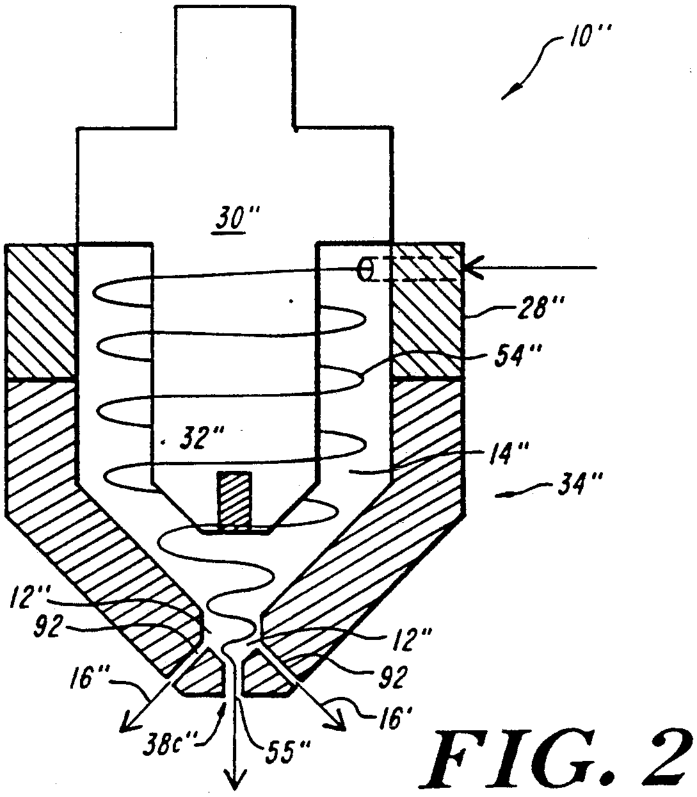
FIG. 2 is a view in vertical section corresponding to FIG. 1 of an alternative embodiment of the present invention using a one piece nozzle with a second gas outlet provided by a set of holes adjacent the main nozzle orifice.
Figure 3:
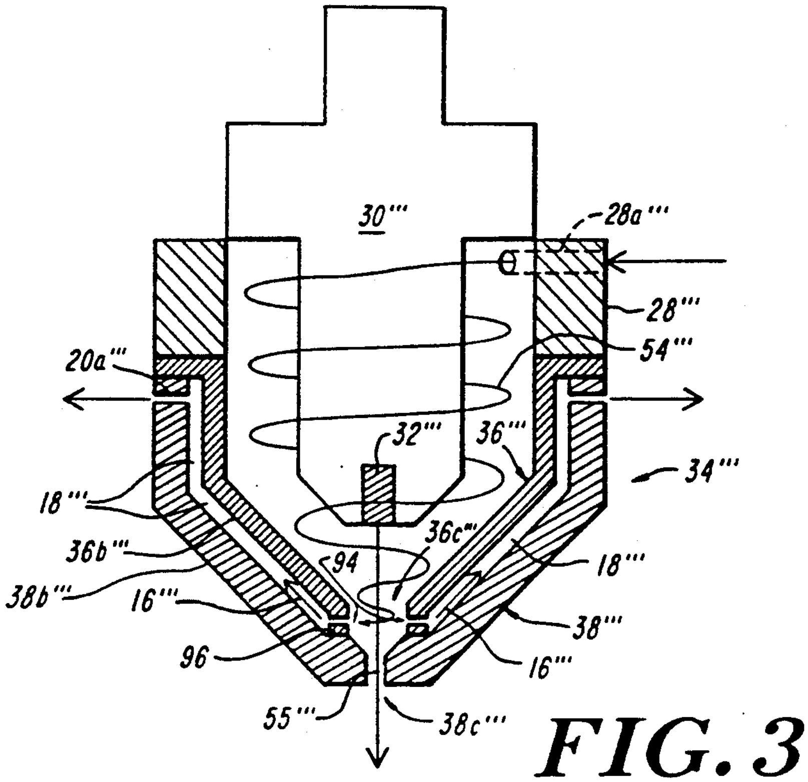
FIG. 3 is a view in vertical section corresponding to FIGS. 1 and 2 of another embodiment of the present invention utilizing a two piece nozzle with plural ports adjacent the main exit orifice feeding an internal bypass channel.
Figure 4:
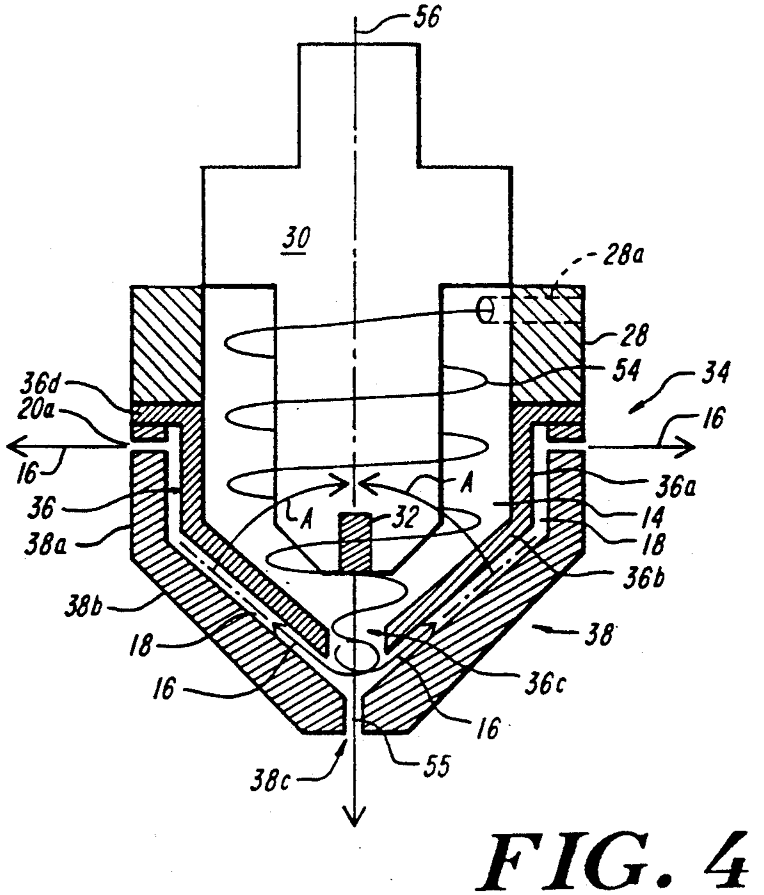
FIG. 4 is a view in vertical section corresponding to FIGS. 1-3 of a preferred embodiment of the present invention utilizing a two piece nozzle and an annular gap as a second gas outlet.

FIGS. 1–3 illustrate alternative embodiments of the present invention. In FIG. 1 the second outlet 12′ is formed by a set of gas outlet ports 90 formed in the swirl ring 28′ downstream of the canted gas inlet holes 28*a*′. (Like parts in each embodiment are identified with the same reference number but with a prime (FIG. 1), double prime (FIG. 2) or triple prime (FIG. 3).) This arrangement increases the mass flow rate of plasma gas within the plasma chamber 14′, but mainly near the upper end. This bypass does not produce a strong flow at the lower end of the plasma chamber and therefore does not exhibit the arc stabilization, electrode wear and nozzle wear advantages to the same extent as the preferred embodiment.

FIG. 2 shows a torch 10″ with a second gas outlet 12″ formed as a set of openings 92 in a single piece, solid nozzle 34″. The openings are located near the exit orifice so a high mass flow rate and strong vortex action appear through most of the plasma chamber 14″. The ports 92 are angled away from the main orifice 30*c*″ so that the bypassed gas flow does not interfere with the plasma arc.

FIG. 3 shows a torch 10‴ with a second gas outlet 12‴ formed as a set of openings 94 in a nozzle wall 96 bridging the pre orifice 36*c*‴ and the nozzle orifice 38*c*‴. The ports feed the diverted gas flow 16‴ to a bypass channel 18‴ formed between the nozzle pieces as in the FIGS. 4–6 embodiment. This embodiment has most of the advantages of the FIGS. 4–6 embodiment, except that there was some increased turbulence and non uniformity in the gas flow just before it enters the nozzle orifice because the bypass flow 16‴ flows out of the nozzle through discrete openings, as opposed to a continuous annular gap.

Using the second gas exit of the present invention to produce a bypass flow, and therefore a high flow velocity in the plasma chamber with a strong vortex flow, the arc is highly stabilized to produce square cut angles with substantially no dross. The cut quality is maintained as the electrode and the nozzle wear. Electrode life is increased since the strong vortex flow, particularly the creation of a virtual nozzle using a pre-orifice of a two part nozzle, holds the arc centered on the hafnium insert. This produces an even wear on the electrode insert. The nozzle life is also increased since the high flow rate provided by this invention reduces the time required to initiate a pilot arc and reduces the formation of a pitted, black inner surface on the nozzle. These advantages are also compatible with nozzle shielding and methods of operation of the torch on start up and cut off that are conducive to extending electrode life.

While this invention has been described with respect to its preferred embodiments, various modifications and alterations will occur to those skilled in the art from the foregoing description and drawings. For example, while the bypass channel has been described as a passage with a cylindrical upper portion and a conical lower portion, it can assume a variety of forms, such as a cup-like lower passage, a series of axial bores instead of the cylindrical passage, or a set of bores in a solid nozzle or nozzle piece communicating with a like set of ports, or a ring like chamber, acting as the second gas outlet of the nozzle. While a two piece nozzle is preferred, it can be formed as a single piece and still have the same operating advantages, although with some increase in cost and/or dimunition in performance. The invention can also be practiced with a variety of second outlet configurations such as circumferentially extending slots, or even multiple outlets set at different points along the flow path. Further, while the invention has been described with vent holes in the bypass or vent flow path, they could be omitted, again with some dimunition in performance. Also, while the vent holes have been described as being formed in the nozzle, they could be formed in another torch component situated in the vent path. More generally, the bypass flow control and response delay functions of the metering valve 22 and the restricting orifices 20*a* can both be performed by the metering valve alone or the flow restricting alone, but with a dimunition in performance. These and other modifications and variations are intended to fall within the scope of the appended claims.

What is claimed is:

1. In a transferred arc plasma torch having a torch body mounting an electrode and a nozzle closely spaced from the electrode at a lower end of the torch to define a plasma chamber therebetween, said nozzle having a central orifice with an upstream entrance end adjacent the electrode and a downstream exit end adjacent and spaced from a workpiece with a high current density plasma jet exiting the torch from the central nozzle orifice and a plasma gas inlet passage formed in said torch body to direct plasma gas to the plasma chamber via a swirl ring, the improvement comprising a plasma gas bypass channel formed in said nozzle with an inlet located downstream of the nozzle orifice entrance end and adjacent the exit end, said channel creating a bypass flow of plasma gas that increases the mass flow rate of the plasma gas through the plasma chamber and creating a highly uniform and very steady flow of the plasma gas through the plasma chamber.

2. The improvement of claim 1 wherein said bypass channel inlet is an annular gap and the bypass channel extends from said annular gap through the nozzle.

3. The improvement according to claim 2 wherein said nozzle has an inner nozzle part and an outer nozzle part surrounding the inner nozzle part and wherein said bypass channel includes an annular inlet opening between said inner and outer nozzle parts.

4. The improvement according to claim 3 wherein said bypass channel is formed by a spacing between said inner and outer nozzle parts and includes at least one vent passage formed in said nozzle downstream of said bypass channel inlet.

5. The improvement according to claim 4 wherein said bypass channel has a generally conical shape with an angle of inclination with respect to the centerline of the torch body of at least about 45°.

6. The improvement according to claim 2 wherein the nozzle has inner and outer nozzle pieces that are mutually spaced to defied between said bypass channel and wherein said inner nozzle has a pre-orifice and said outer nozzle has a nozzle orifice aligned with said pre-orifice, said pre-orifice having a larger cross sectional opening than said nozzle orifice and creating a strong vortex flow of said plasma gas opposite said electrode that stabilizes the location of the arc on the electrode.

7. The improvement according to claim 6 wherein the height of said bypass channel between said pre-orifice and said nozzle orifice is sized to produce said bypass flow while maintaining a sufficient flow rate and vortex flow pattern to stabilize the arc at the entrance to said nozzle orifice.

8. The improvement according to claim 1 wherein said bypass channel includes a vent path to atmosphere.

9. The improvement according to claim 8 wherein said vent path includes at least one vent opening that produces flow friction but does not substantially impede flow of plasma gas therethrough.

10. The improvement according to claim 9 further comprising bypass gas flow control means operably connected in said vent path downstream of said at least one vent opening to form a choke point removed from said at least one opening.

11. The improvement according to claim 10 further comprising means operably connected to said plasma gas inlet passage to control the total flow of plasma gas to the torch.

12. The improvement according to claim 1 wherein said bypass channel comprises a set of holes formed in said nozzle extending from said central nozzle orifice to the exterior surface of said nozzle.

13. The improvement according to claim 6 wherein said bypass channel includes a set of holes formed in a nozzle wall portion extending from said pre-orifice to said nozzle orifice with said holes each in fluid communication between the interior of said nozzle and a conical channel formed in said nozzle.

14. A nozzle for a high current density plasma arc torch having a torch body, an electrode mounted in the body in a spaced relationship with respect to the nozzle to define a plasma chamber therebetween with a nozzle orifice at one end of the nozzle providing an exit for the plasma arc from the torch to a workpiece when the arc is transferred, and a plasma gas inlet passage that directs plasma gas to the plasma arc chamber at its upper end opposite the nozzle orifice, comprising an inner nozzle body having a generally hollow, cylindrical upper portion and a downwardly converging lower portion terminating in a pre-orifice, an outer nozzle body having a hollow generally cylindrical first portion that surrounds said inner body first portion, and a downwardly converging lower portion that surrounds said inner body lower portion in a mutually spaced relationship to define therebetween an annular bypass channel, said outer body lower portion terminating in a nozzle orifice that is aligned with and axially spaced from said pre-orifice, and, an opening between said pre orifice and said nozzle orifice that provides a second outlet for said plasma gas from said nozzle to said bypass channel, at least one vent opening formed in said nozzle at the end of said channel remote from said opening.

15. The nozzle of claim 14 wherein the inner surface of said inner nozzle, in combination with said electrode, defines a flow path for the plasma gas through the plasma chamber that has a progressively smaller flow radius to produce a high velocity vortex at the pre-orifice.

16. The nozzle according to claim 15 wherein said bypass channel is generally conical and has an angle of inclination with respect to the centerline of the nozzle of at least 45°.

17. The nozzle according to claim 16 wherein the diameter of the pre-orifice is greater than the diameter of the nozzle orifice, and wherein the spacing between the pre-orifice and the nozzle orifice is a continuous gap, 18. The method of operating a high current density, transferred arc plasma cutting torch having an electrode and a nozzle mounted in a mutually closely spaced relationship at a lower end of a torch body with a plasma chamber defined between the electrode and the nozzle, a swirling flow of plasma gas to the plasma chamber at an upper end thereof, and a nozzle orifice that guides a transferred plasma arc to a workpiece from an orifice entrance end to an exit orifice end, comprising, directing a portion of the plasma gas flow from the plasma chamber downstream of the orifice entrance end and before it exits through the nozzle orifice at the exit end to increase the mass flow rate in the plasma chamber without increasing the mass flow rate through the nozzle orifice, and creating a highly uniform and very steady flow of the plasma gas through the plasma chamber at the same times as said directing.

19. The method of claim 18 wherein said directing occurs as close to said nozzle exit orifice end as possible to extend said high velocity flow over the electrode, including its lower end opposite said nozzle orifice.

20. The method of claim 18 further comprising creating a virtual nozzle with said vortex flow at a point between the lower end of said electrode and the nozzle orifice.

21. The method of claim 18 wherein said directing is highly uniform and stable to produce a high degree of arc stability.

22. The method of claim 18 wherein said directing includes venting said directed gas flow portion to atmosphere.

23. The method of claim 22 wherein said venting includes guiding said directed gas portion away from said nozzle orifice along a path that forms an angle of at least 45° with the centerline of the torch.

24. The method of claim 22 wherein said venting includes controlling the flow rate of said directed flow at a point remote from said nozzle orifice to introduce a delay int he response of flow in said plasma chamber to changes in said diverted flow.

25. The method of claim 24 further comprising the step of restricting said directed flow prior to said controlling to increase the uniformity of said flow.

26. The method of claim 24 further comprising the step of controlling the total flow rate of plasma gas to said torch in coordination with said venting control to set the ratio of the directed plasma gas flow rate and the flow rate of the plasma gas through said nozzle orifice that is not so directed.

* * * * *